(12) United States Patent
Caffro et al.

(10) Patent No.: US 10,431,410 B2
(45) Date of Patent: Oct. 1, 2019

(54) ELECTRICAL SWITCHING APPARATUS AND HARNESS ASSEMBLY THEREFOR

(71) Applicant: EATON CORPORATION, Cleveland, OH (US)

(72) Inventors: Brian Scott Caffro, Aliquippa, PA (US); Jack Edward Devine, Pittsburgh, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 94 days.

(21) Appl. No.: 15/822,647

(22) Filed: Nov. 27, 2017

(65) Prior Publication Data

US 2019/0164711 A1    May 30, 2019

(51) Int. Cl.
| | |
|---|---|
| *H01R 13/58* | (2006.01) |
| *H01H 71/02* | (2006.01) |
| *H01B 7/00* | (2006.01) |
| *H01H 1/40* | (2006.01) |
| *H01H 83/20* | (2006.01) |
| *H02G 15/007* | (2006.01) |
| *H01H 71/08* | (2006.01) |
| *H01R 4/72* | (2006.01) |

(52) U.S. Cl.
CPC ....... *H01H 71/0257* (2013.01); *H01B 7/0045* (2013.01); *H01H 1/403* (2013.01); *H01H 71/08* (2013.01); *H01H 83/20* (2013.01); *H01R 13/5804* (2013.01); *H02G 15/007* (2013.01); *H01R 4/72* (2013.01)

(58) Field of Classification Search
CPC ....... H01R 12/00; H01R 13/58; H01R 13/582
USPC .............. 439/449; 174/135, 72 A
See application file for complete search history.

(56) References Cited

U.S. PATENT DOCUMENTS

| | | | |
|---|---|---|---|
| 4,343,844 A | 8/1982 | Thayer et al. | |
| 4,849,582 A | 7/1989 | Stevenson | |
| 4,894,631 A | 1/1990 | Castonguay et al. | |
| 5,136,488 A | 8/1992 | McElwee | |
| 5,367,282 A | * 11/1994 | Clem | ........... G01K 1/08 338/22 R |
| 5,493,265 A | 2/1996 | Whipple et al. | |

(Continued)

FOREIGN PATENT DOCUMENTS

| | | |
|---|---|---|
| JP | H10-12118 A | 1/1998 |
| KR | 100 952 825 B1 | 4/2010 |

OTHER PUBLICATIONS

European Patent Office, "International Search Report and Written Opinion", Corresp. PCT/EP2018/025296, dated Mar. 11, 2019, 20 pp.

(Continued)

*Primary Examiner* — Phuong K Dinh
(74) *Attorney, Agent, or Firm* — Eckert Seamans Cherin & Mellott, LLC

(57) ABSTRACT

A harness assembly includes a plurality of individual wires and a restriction mechanism. The restriction mechanism has a sleeve member surrounding each of the plurality of individual wires in order to prevent longitudinal movement of each of the plurality of individual wires with respect to each other. Each of the plurality of individual wires has a helical-shaped portion located internal with respect to the sleeve member, thereby allowing each of the plurality of individual wires to engage the sleeve member.

19 Claims, 4 Drawing Sheets

(56) References Cited

U.S. PATENT DOCUMENTS

| | | |
|---|---|---|
| 6,255,893 B1 * | 7/2001 | Dishongh .......... G01R 31/3004 |
| | | 327/525 |
| 6,388,217 B1 | 5/2002 | Turner et al. |
| 7,922,517 B2 * | 4/2011 | Landis ................ H01R 13/639 |
| | | 439/445 |
| 8,035,029 B2 | 10/2011 | Mullen |
| 9,553,373 B2 | 1/2017 | Jurek et al. |
| 2007/0080766 A1 | 4/2007 | Sisley et al. |
| 2010/0209057 A1 | 8/2010 | Drouard |
| 2012/0319806 A1 | 12/2012 | Mills et al. |
| 2015/0279604 A1 | 10/2015 | Whitaker et al. |
| 2016/0268704 A1 | 9/2016 | Jurek et al. |

OTHER PUBLICATIONS

European Patent Office, "International Search Report and Written Opinion" (for corresponding application PCT/US2016/017661), dated May 13, 2016, 34 pp.

* cited by examiner

ELECTRICAL SWITCHING APPARATUS AND HARNESS ASSEMBLY THEREFOR

BACKGROUND

Field

The disclosed concept relates generally to electrical switching apparatus such as, for example, circuit breakers. The disclosed concept also relates to harness assemblies for electrical switching apparatus.

Background Information

Electrical switching apparatus are used to protect electrical circuitry from damage due to a trip condition, such as, for example, an overcurrent condition, an overload condition, an undervoltage condition, a relatively high level short circuit or fault condition, a ground fault or arc fault condition. Molded case circuit breakers, for example, include at least one pair of separable contacts which are operated either manually by way of a handle located on the outside of the case, or automatically by way of a trip unit in response to the trip condition. Some molded case circuit breakers have wires that attach to internal components and exit the circuit breaker for use with external systems. In order for the circuit breaker to be properly certified, such as, for example and without limitation, to be properly certified by Underwriters Laboratories Inc., headquartered in Northbrook, Ill., the wiring configuration must pass a pull test. The pull test generally involves disconnecting the wires from the internal components and applying a pull force (e.g., ten pounds) to each of the wires separately external the circuit breaker for one minute. During the test, there can be no displacement within the wire routing.

A known solution that attempts to satisfy the pull test involves extending the wires through a sleeve member (e.g., without limitation, a heat shrink tube) and clamping the sleeve member with a blocking member. One problem with this solution is that many circuit breakers do not have adequate space to accommodate a blocking member. Furthermore, requiring a blocking member for each bundle of wires within the circuit breaker undesirably increases the cost of the circuit breaker, and also complicates its manufacture.

There is, therefore, room for improvement in electrical switching apparatus and harness assemblies therefor.

SUMMARY

These needs and others are met by embodiments of the disclosed concept, which are directed to an improved electrical switching apparatus and harness assembly therefor.

As one aspect of the disclosed concept, a harness assembly for an electrical switching apparatus is provided. The electrical switching apparatus includes a frame having a slot, and a printed circuit board coupled to the frame. The harness assembly comprises a plurality of individual wires each structured to extend through the slot and be electrically connected to the printed circuit board, and a restriction mechanism comprising a sleeve member surrounding each of the plurality of individual wires in order to prevent longitudinal movement of each of the plurality of individual wires with respect to each other. The sleeve member is structured to be located within the slot. Each of the plurality of individual wires has a helical-shaped portion located internal with respect to the sleeve member, thereby allowing each of the plurality of individual wires to engage the sleeve member.

As another aspect of the disclosed concept, a harness assembly comprises a plurality of individual wires and a restriction mechanism comprising a sleeve member surrounding each of the plurality of individual wires in order to prevent longitudinal movement of each of the plurality of individual wires with respect to each other. Each of the plurality of individual wires has a helical-shaped portion located internal with respect to the sleeve member, thereby allowing each of the plurality of individual wires to engage the sleeve member.

As another aspect of the disclosed concept, an electrical switching apparatus is provided. The electrical switching apparatus includes a frame having a slot, a printed circuit board coupled to the frame, and a harness assembly. The harness assembly comprises a plurality of individual wires each extending through the slot and being electrically connected to the printed circuit board, and a restriction mechanism comprising a sleeve member surrounding each of the plurality of individual wires in order to prevent longitudinal movement of each of the plurality of individual wires with respect to each other. The sleeve member is located within the slot. Each of the plurality of individual wires has a helical-shaped portion located internal with respect to the sleeve member, thereby allowing each of the plurality of individual wires to engage the sleeve member.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the statement that two or more parts are "coupled" together shall mean that the parts are joined together either directly or joined through one or more intermediate parts.

As employed herein, the statement that two or more parts or components "engage" one another shall mean that the parts exert a force against one another either directly or through one or more intermediate parts or components.

As employed herein, the term "blocking member" shall refer to any suitable fastening mechanism expressly including, but not limited to, zip ties and/or wire ties.

Figures 1, 2:
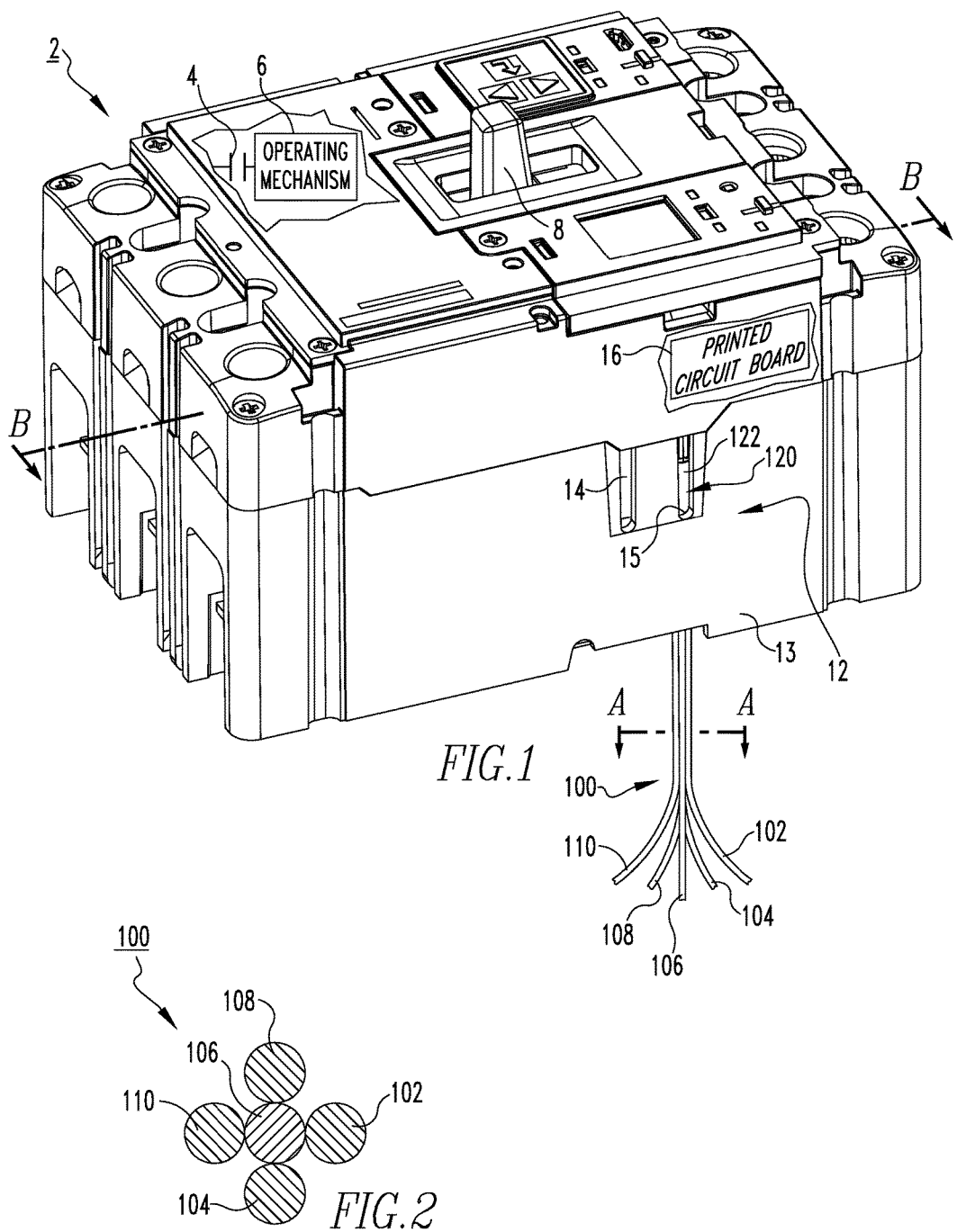
FIG. 1 is a partially simplified isometric view of an electrical switching apparatus and harness assembly therefor, in accordance with one non-limiting embodiment of the disclosed concept.
FIG. 2 is a section view of a portion of the harness assembly of FIG. 1, taken along line A-A of FIG. 1.

FIG. 1 is a partially simplified isometric view of an electrical switching apparatus (e.g., without limitation, multi-pole molded case circuit breaker 2), in accordance with one non-limiting embodiment of the disclosed concept. The circuit breaker 2 includes a pair of separable contacts 4 (shown in simplified form), an operating mechanism 6 (shown in simplified form) which opens and closes the separable contacts 4 in a generally well known manner, a frame 12, and a printed circuit board 16 coupled to the frame 12. The operating mechanism 6 has an operating handle 8 in order to allow operators to manually open and close the separable contacts 4. The frame 12 has an external wall 13, an internal wall 14, and a slot 15 between the external wall 13 and the internal wall 14. In one example embodiment the walls 13,14 are spaced from and located substantially parallel to each other. In accordance with a novel aspect of the disclosed concept, the circuit breaker 2 further includes a novel harness assembly 100.

Figure 3:
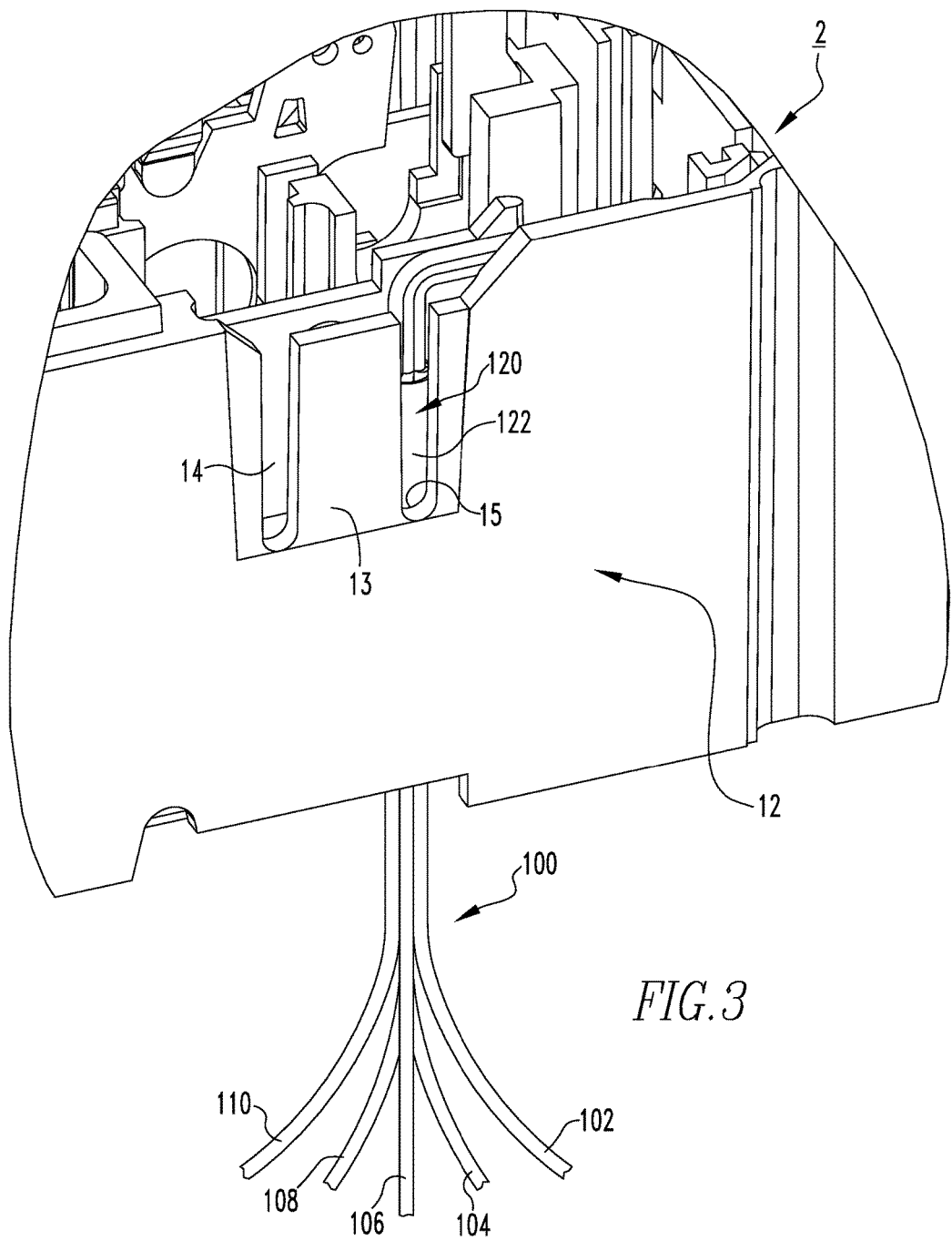
FIG. 3 is an enlarged isometric view of a portion of the electrical switching apparatus and harness assembly therefor of FIG. 1, shown with portions removed in order to see hidden structures.

The harness assembly 100 includes a plurality of individual wires 102,104,106,108,110 (see also, for example, FIG. 2) and a restriction mechanism 120. It will be appreciated that each of the wires 102,104,106,108,110 has a corresponding tubular-shaped insulator surrounding at least one conductor. The wires 102,104,106,108,110 each extend through the slot 15 (i.e., between the walls 13,14) and are electrically connected to the printed circuit board 16. The restriction mechanism 120 includes a sleeve member (e.g., without limitation, heat shrink tube 122). One example sleeve member that may be used as the heat shrink tube 122 is 'Heat Shrink Tubing EPS-300', manufactured by 3M, Electrical Markets Division, of Austin, Tex. It will be appreciated with reference to FIG. 3 that the heat shrink tube 122 surrounds each of the wires 102,104,106,108,110 at or about the slot 15. In one example embodiment, the heat shrink tube 122 is located within the slot 15 and engages the frame 12 (e.g., without limitation, the walls 13,14) in a press fit manner in order to prevent longitudinal movement of the wires 102,104,106,108,110 with respect to the slot 15. The heat shrink tube 122 also surrounds each of the wires 102,104,106,108,110 in order to prevent longitudinal movement of each of the wires 102,104,106,108,110 with respect to each other.

Figure 4:
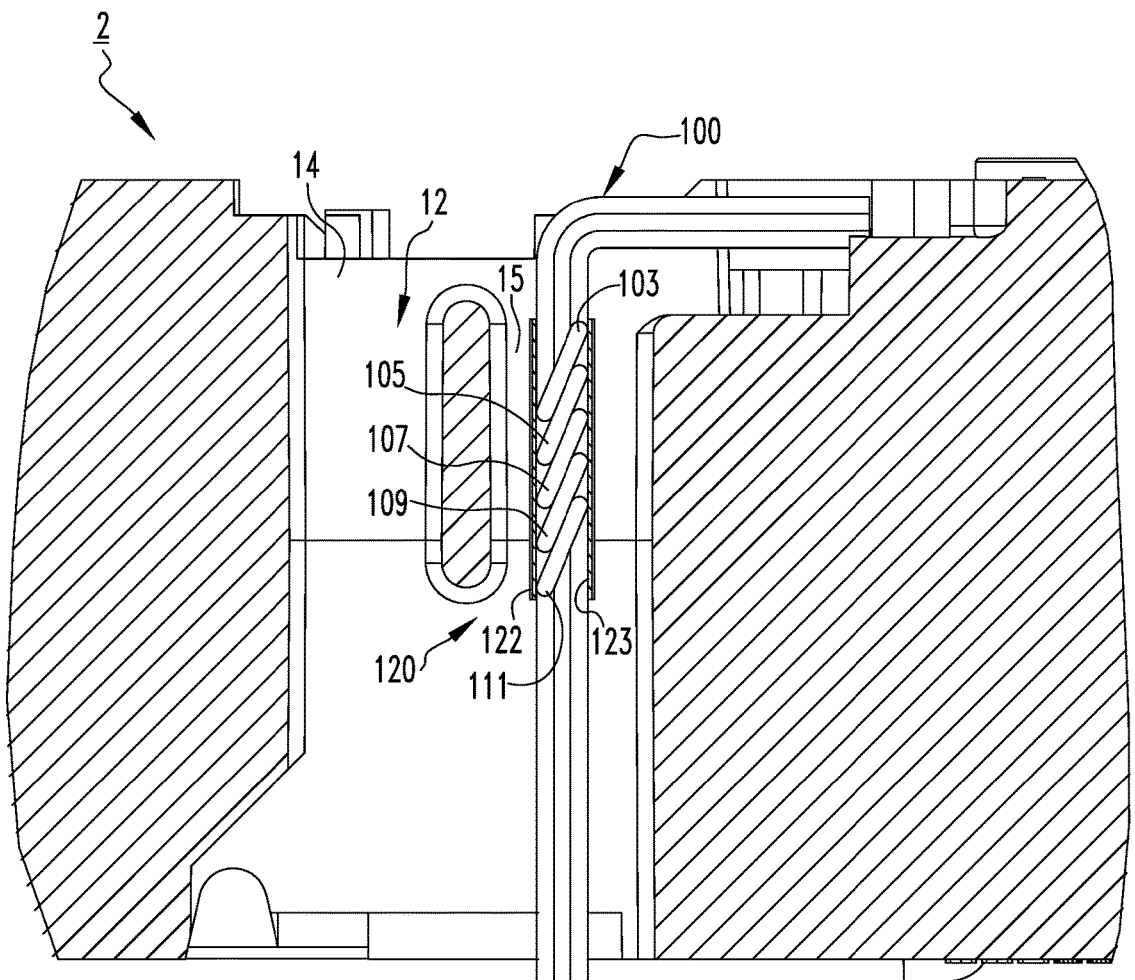
FIG. 4 is a simplified non-limiting section view of a portion of the electrical switching apparatus and harness assembly therefor of FIG. 1, taken along line B-B of FIG. 1.

FIG. 4 shows a section view of a portion of the circuit breaker 2. As shown, each of the wires 102,104,106,108,110 has a corresponding helical-shaped portion 103,105,107,109,111 located internal with respect to the heat shrink tube 122. The helical-shaped portions 103,105,107,109,111 have the shape of a helix in that they each generally follow a three-dimensional curve lying on a cylinder. It will be appreciated that, while portions of the harness assembly 100 are difficult to illustrate, FIG. 4 depicts one non-limiting simplified illustration of what the harness assembly 100 could look like. For example, within the heat shrink tube 122, each of the wires 102,104,106,108,110 is twisted (i.e., is revolved around a common central axis and/or is not linear). Compare for example, FIG. 2, which shows the wires 102,104,106,108,110 at a location removed from the heat shrink tube 122, to FIG. 4, in which, within the heat shrink tube 122, each of the wires 102,104,106,108,110 advantageously engages the heat shrink tube 122. In one example embodiment, the heat shrink tube 122 has an adhesive inner layer 123 engaging each of the helical-shaped portions 103,105,107,109,111. The adhesive inner layer may, for example and without limitation, engage each of the helical-shaped portions 103,105,107,109,111 continuously from a top end of the heat shrink tube 122 to a bottom end of the heat shrink tube 122. Employing a twist (i.e., the helical-shaped portions 103,105,107,109,111) within the heat shrink tube 122 is advantageous for a number of reasons.

More specifically, because each of the wires 102,104,106, 108,110 engages the heat shrink tube 122, the circuit breaker 2 is able to satisfy UL pull tests. For example, many prior art wiring configurations (not shown) having a plurality of wires typically have central wires only engaging other wires (e.g., not sleeve members). As a result, during UL pull testing, these central wires fail to stay connected because they have no heat shrink tube to bond to, and thus slide relatively easily through the wire bundle.

The harness assembly 100 of the instant disclosed concept, by way of contrast, results in each of the wires 102,104,106,108,110 being exposed to (i.e., engaging) the heat shrink tube 122. Although depicted as being cylindrical-shaped in the simplified non-limiting example illustration of FIG. 4, it will be appreciated that the heat shrink tube 122 and adhesive inner layer 123 therefor are conformed to the shape of, and compressed against, the helical-shaped portions 103,105,107,109,111, thereby further enhancing the engagement between the heat shrink tube 122 and the helical-shaped portions 103,105,107,109,111. Thus, when a load is applied to the end of any one of the wires 102,104, 106,108,110, the engagement between the helical-shaped portions 103,105,107,109,111 and the adhesive inner layer 123, and the press fit connection between the heat shrink tube 122 and the frame 12, advantageously minimizes and/or prevents the individual wires 102,104,106,108,110 from moving with respect to each other and with respect to the slot 15. That is, the helical-shaped portions 103,105,107, 109,111 are each bonded to the adhesive inner layer 123 such that an attempted displacement (e.g., without limitation, during UL pull testing) of any one of the wires 102,104,106,108,110 would result in a pull on the heat shrink tube 122 via the adhesive inner layer 123. Because the heat shrink tube 122 is press fit into the frame 12 of the circuit breaker 2, this pull of any one of the wires 102,104, 106,108,110 would advantageously not cause the heat shrink tube 122, or any one of the wires 102,104,106,108,110 to be pulled through the slot during UL testing.

Additionally, manufacturing of the circuit breaker 2 is simplified and less expensive by employing the harness assembly 100. More specifically, many prior art circuit breakers (not shown) require blocking members to be secured (e.g., clamped) to sleeve members in order to prevent the sleeve members from being pulled through slots in frames. This adds to the cost of the circuit breaker and complicates manufacture. In one example embodiment of the instant disclosed concept, the restriction mechanism 120 is devoid of a blocking member clamped to the heat shrink tube 122. In other words, the circuit breaker 2 and harness assembly 100 therefor is advantageously able to satisfy UL requirements and be manufactured without requiring any separate blocking members. As a result, assembly is simplified and manufacturing costs are thereby reduced.

Figure 5:
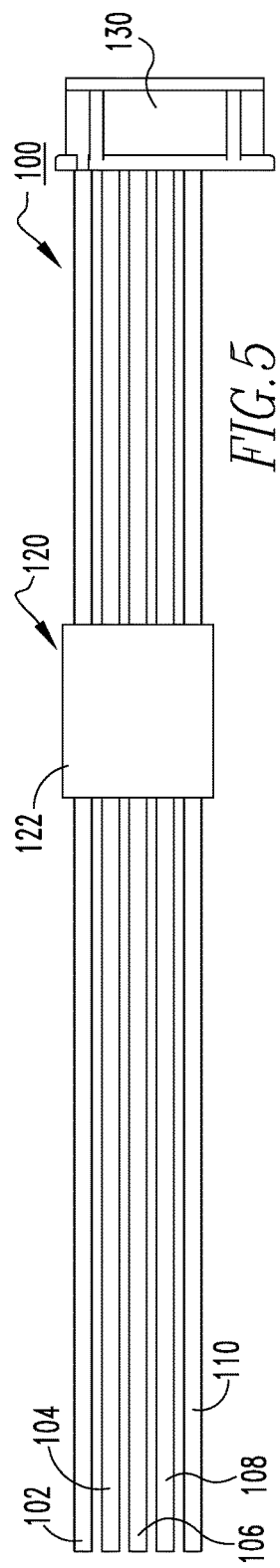
FIG. 5 is a schematic front view of the harness assembly of FIG. 1.

FIG. 5 is a schematic front view of the harness assembly 100. As shown, the harness assembly 100 further includes a connector member 130 connected to each of the wires 102,104,106,108,110. In operation, the connector member 130 is directly connected with the printed circuit board 16 (FIG. 1). During UL pull testing, the connector member 130 is disconnected from the printed circuit board 16, and each of the wires 102,104,106,108,110 is individually tested. As discussed above, the novel harness assembly 100 advantageously satisfies UL pull testing requirements.

Figure 6:
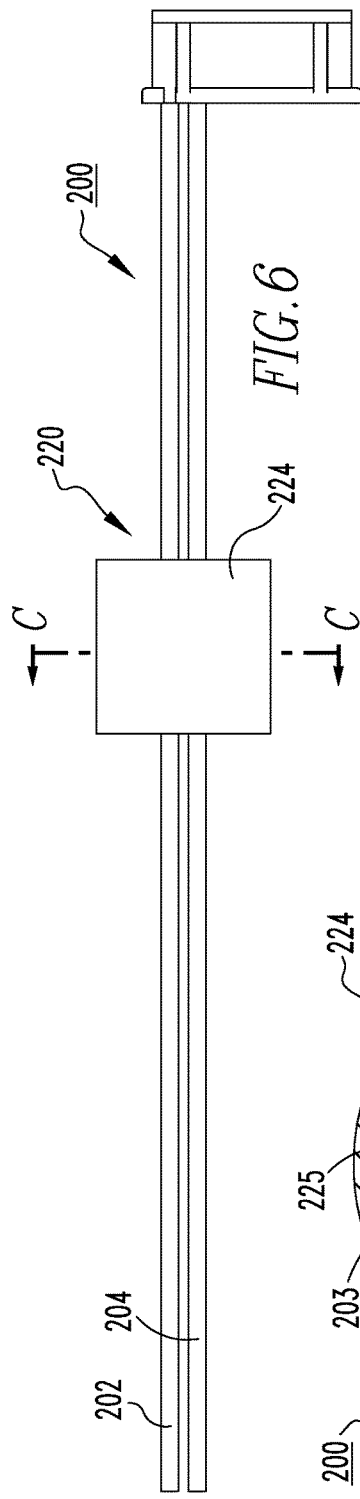
FIG. 6 is a schematic front view of another harness assembly, in accordance with another non-limiting embodiment of the disclosed concept.
Figure 7:
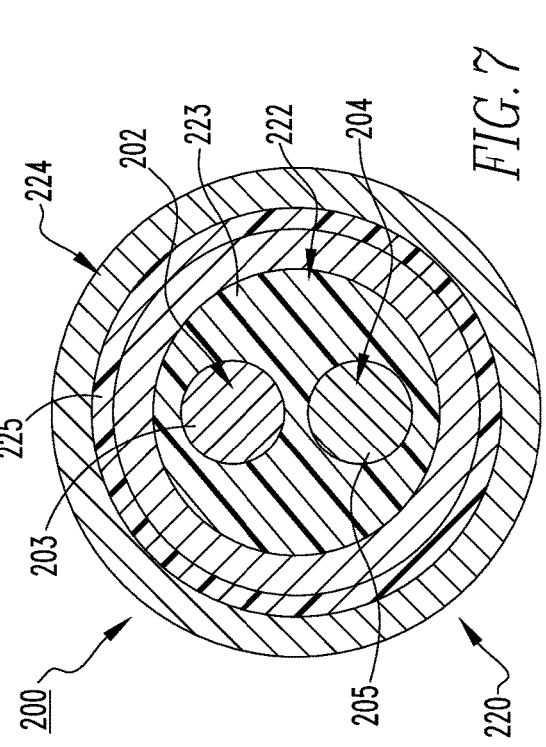
FIG. 7 is a simplified non-limiting section view of the harness assembly of FIG. 6, taken along line C-C of FIG. 6.

FIG. 6 and FIG. 7 are schematic front, and section views, respectively, of another harness assembly 200 that may be incorporated into the circuit breaker 2 in place of the harness assembly 100, in accordance with another non-limiting embodiment of the disclosed concept. The example harness assembly 200 has two individual wires 202,204 and a restriction mechanism 220. The restriction mechanism 220 includes a first sleeve member (e.g., without limitation, heat shrink tube 222, not shown in FIG. 6, but see FIG. 7) and a second sleeve member (e.g., without limitation, heat shrink tube 224). Each of the wires 202,204 extends through the first and second heat shrink tubes 222,224. The second heat shrink tube 224 surrounds the first heat shrink tube 222. In one example embodiment, and as shown in FIG. 7, the first and second heat shrink tubes 222,224 each have corresponding adhesive inner layers 223,225. The adhesive inner layer 223 of the first heat shrink tube 222 engages the wires 202,204, and the adhesive inner layer 225 of the second heat shrink tube 224 engages an exterior of the first heat shrink tube 222. In one example embodiment, each of the wires 202,204 has a helical-shaped portion located internal with respect to the heat shrink tube 222. FIG. 7 depicts one non-limiting example cut of the harness assembly 200. It will be appreciated that at different sections, the wires 202,204 could appear at different locations relative to the heat shrink tubes 222,224. Furthermore, it will also be appreciated that the wires 202,204 could extend through the heat shrink tubes 222,224 without having helical-shaped portions, without departing from the scope of the disclosed concept.

The heat shrink tubes 222,224 advantageously allow the circuit breaker 2 and harness assembly 200 therefor to satisfy UL pull testing requirements. For example, the first heat shrink tube 222 surrounds each of the wires 202,204 in order to prevent longitudinal movement of the wires 202, 204 with respect to each other. In accordance with the disclosed concept, the second heat shrink tube 224 is structured to engage the frame 12 (e.g., without limitation, the walls 13,14) within the slot 15 in a press fit manner in order to prevent longitudinal movement of the wires 202,204 with respect to the slot 15. It will thus be appreciated that when the harness assembly 200 is installed in the circuit breaker 2, the first heat shrink tube 222 does not engage (i.e., is spaced from) the frame 12. Accordingly, the instant disclosed concept contemplates satisfying UL pull testing requirements, simplifying manufacture, and doing so at less cost, with less than four wires. Specifically, the harness assembly 200 achieves these advantages by employing two heat shrink tubes 222,224 instead of one. In a further alternative embodiment of the disclosed concept, not shown, more than two heat shrink tubes, each being concentric with each other, are provided with a restriction mechanism. It will also be appreciated that suitable alternative harness assemblies (e.g., without limitation, harness assemblies having at least seven wires, not shown) are contemplated herein, wherein each of the seven wires engage a single heat shrink tube.

While the disclosed concept has been described in association with the harness assemblies 100,200 being used in conjunction with the circuit breaker 2, it will be appreciated that suitable alternative applications (not shown) are contemplated herein. That is, the harness assemblies 100,200 may extend through other structures besides through the slot 15 in the frame 12, and thus provide the aforementioned advantages for these alternative applications. It will also be appreciated that while the helical-shaped portions 103,105, 107,109,111 and heat shrink tube 122 are generally located internal with respect to the circuit breaker 2 (see, for example, FIG. 4, in which the heat shrink tube 122 and helical-shaped portions 103,105,107,109,111 have a predetermined finite length), suitable alternative implementations of the disclosed concept are contemplated herein. For example and without limitation, it is within the scope of the disclosed concept to lengthen the helical-shaped portions 103,105,107,109,111 such that they traverse any length of the wires 102,104,106,108,110. That is, the harness assembly 100 may be structured such that the entire length of the wires 102,104,106,108,110 is helical-shaped. The harness assembly 100 may also be structured such that any number of segments within the individual wires 102,104,106,108, 110 may have a corresponding helical shape about a corresponding center line.

Accordingly, it will be appreciated that the disclosed concept provides for an improved (e.g., without limitation, able to satisfy UL pull testing requirements, easier to manufacture, less expensive) electrical switching apparatus 2 and harness assembly 100,200 therefor.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A harness assembly for an electrical switching apparatus, said electrical switching apparatus comprising a frame having a slot, and a printed circuit board coupled to said frame, said harness assembly comprising:
   a plurality of individual wires each structured to extend through the slot and be electrically connected to said printed circuit board; and
   a restriction mechanism comprising a sleeve member surrounding each of said plurality of individual wires in order to prevent longitudinal movement of each of said plurality of individual wires with respect to each other, said sleeve member being structured to be disposed within the slot,
   wherein each of said plurality of individual wires has a helical-shaped portion disposed internal with respect to said sleeve member, thereby allowing each of said plurality of individual wires to engage said sleeve member.

2. The harness assembly of claim 1 wherein said sleeve member has an adhesive inner layer engaging each of said plurality of individual wires.

3. The harness assembly of claim 2 wherein said sleeve member is a heat shrink tube.

4. The harness assembly of claim 3 wherein said restriction mechanism is devoid of a blocking member clamped to said heat shrink tube.

5. The harness assembly of claim 3 wherein said plurality of individual wires comprises at least seven wires.

6. The harness assembly of claim 3 wherein said heat shrink tube is structured to engage said frame within the slot in a press fit manner in order to prevent longitudinal movement of said plurality of individual wires with respect to the slot.

7. The harness assembly of claim 3 wherein said restriction mechanism further comprises another sleeve member surrounding said heat shrink tube; wherein each of said plurality of individual wires extends through said another sleeve member; and wherein said another sleeve member is structured to engage said frame within the slot in a press fit manner in order to prevent longitudinal movement of said plurality of individual wires with respect to the slot.

8. The harness assembly of claim 7 wherein said heat shrink tube is not structured to engage said frame.

9. The harness assembly of claim 7 wherein said plurality of individual wires consists of less than four wires.

10. An electrical switching apparatus comprising:
a frame having a slot;
a printed circuit board coupled to said frame; and
a harness assembly comprising:
   a plurality of individual wires each extending through the slot and being electrically connected to said printed circuit board, and
   a restriction mechanism comprising a sleeve member surrounding each of said plurality of individual wires in order to prevent longitudinal movement of each of said plurality of individual wires with respect to each other, said sleeve member being disposed within the slot,
wherein each of said plurality of individual wires has a helical-shaped portion disposed internal with respect to said sleeve member, thereby allowing each of said plurality of individual wires to engage said sleeve member.

11. The electrical switching apparatus of claim 10 wherein said sleeve member has an adhesive inner layer engaging each of said plurality of individual wires.

12. The electrical switching apparatus of claim 11 wherein said sleeve member is a heat shrink tube.

13. The electrical switching apparatus of claim 12 wherein said restriction mechanism is devoid of a blocking member clamped to said heat shrink tube.

14. The electrical switching apparatus of claim 12 wherein said heat shrink tube engages said frame within the slot in a press fit manner in order to prevent longitudinal movement of said plurality of individual wires with respect to the slot.

15. The electrical switching apparatus of claim 12 wherein said restriction mechanism further comprises another sleeve member surrounding said heat shrink tube; wherein each of said plurality of individual wires extends through said another sleeve member; and wherein said another sleeve member engages said frame within the slot in a press fit manner in order to prevent longitudinal movement of said plurality of individual wires with respect to the slot.

16. The electrical switching apparatus of claim 15 wherein said heat shrink tube does not engage said frame.

17. The electrical switching apparatus of claim 15 wherein said plurality of individual wires consists of less than four wires.

18. The electrical switching apparatus of claim 15 wherein said another sleeve member has an adhesive inner layer engaging said heat shrink tube.

19. The electrical switching apparatus of claim 10 wherein said electrical switching apparatus is a molded case circuit breaker.

\* \* \* \* \*